United States Patent
Markowitz et al.

[15] 3,636,313
[45] Jan. 18, 1972

[54] HIGH-RESOLUTION MAGNETIC CLOCK GENERATOR

[72] Inventors: Ivan N. Markowitz, Framingham; Abraham Cherian, Marlboro, both of Mass.

[73] Assignee: Honeywell, Inc., Minneapolis, Minn.

[22] Filed: May 6, 1970

[21] Appl. No.: 34,934

[52] U.S. Cl. ................................................235/61.11 D
[51] Int. Cl. ........................................................G06k 7/016
[58] Field of Search ..............................235/61.11, 61.114; 340/174.1 A, 168

[56] References Cited

UNITED STATES PATENTS 2,994,853  8/1961  Astrahan..........................340/174.1 A
3,070,800  12/1962  Brown, Jr. et al................340/174.1 A Primary Examiner—Daryl W. Cook
Attorney—Fred Jacob and Leo Stanger

[57] ABSTRACT

An improved high-resolution magnetic clock generator is disclosed for generating timing pulses particularly useful in combination with an electronic punched card reader for timing or synchronizing the reading and/or transmission of information being stored in uniformly spaced columns of punched cards. A magnetoresistor assembly in combination with a rotating toothed wheel or gear generates two sinusoidally varying electric signals 90° out of phase with each other, said signals being subsequently processed through a circuit means to convert said sinusoidally varying signals to an electric pulse train whose frequency is proportional to wheel speed and independent of wheel eccentricity.

21 Claims, 13 Drawing Figures

INVENTORS
IVAN N. MARKOWITZ
ABRAHAM CHERIAN

ATTORNEY

INVENTORS
IVAN N. MARKOWITZ
ABRAHAM CHERIAN

BY Nicholas Prasinos

ATTORNEY

TIME A

TIME B

TIME C

INVENTORS
IVAN N. MARKOWITZ
ABRAHAM CHERIAN

BY Nicholas Prasinos

ATTORNEY

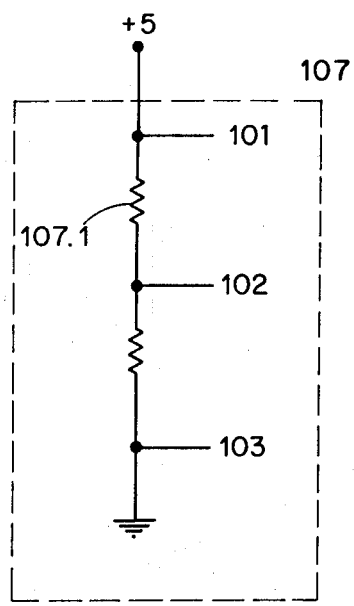
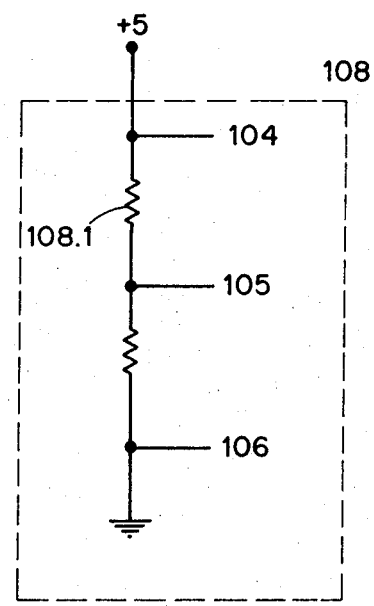
*Fig. 4A.*   *Fig. 4B.*
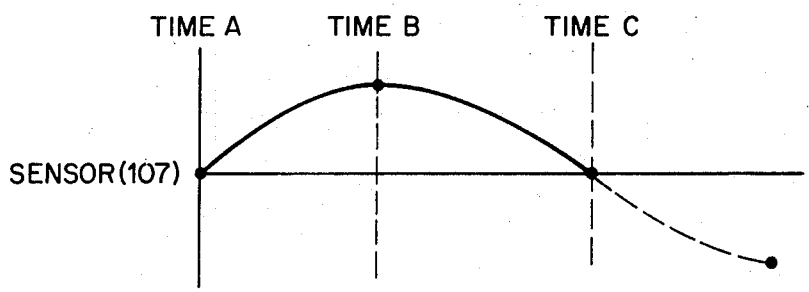
*Fig. 5A.*
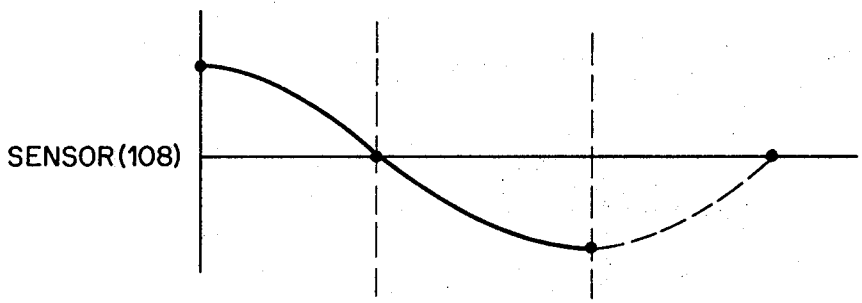
*Fig. 5B.*
INVENTORS
IVAN N. MARKOWITZ
ABRAHAM CHERIAN
BY
Nicholas P Pramos
ATTORNEY

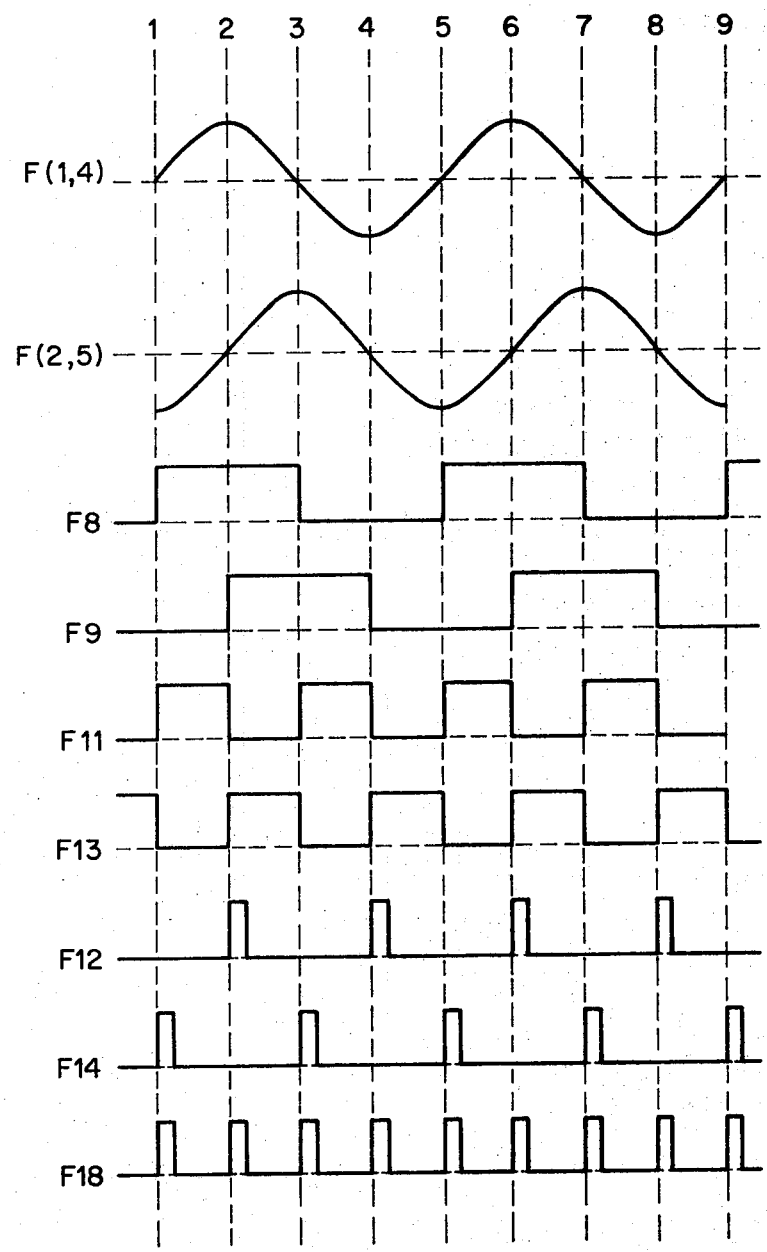

HIGH-RESOLUTION MAGNETIC CLOCK GENERATOR

BACKGROUND OF THE INVENTION

The invention relates generally to a device for synchronizing the readout of coded information on punched cards, and more particularly, to an improved high-resolution magnetic clock generator for generating pulses that move in synchronism with card feed means for gating the information which is read out.

In the reading of standard punch cards of a computer system by a card reader, it is necessary that data be synchronously transferred to a central processor for orderly further processing and for identifiable storage of each record on file that can be readily accessed for subsequent processing. A method must be provided for counting and identifying each column as it passes under the read-out means.

Prior art systems utilize synchronizing pulses generated by detecting marks printed on the margin of each card and aligned with each column. A disadvantage of such a system is that cards not so marked may not be meaningfully read by a card reader.

Another prior art method consists of a timing wheel comprised of a transparent material such as, for example, glass, having accurately etched marks extending radially in a regular pattern about the periphery of the wheel for inhibiting the transmission of light through the marked position of the wheel. Light energy is permitted to fall on the glass wheel as it rotates synchronously with the punched card feed rollers of the feed mechanism and is periodically transmitted between the etched marks to a photo electric cell, which generates electric timing pulses; these timing pulses are aligned with each column and are used to count the columns of a punched card. This system does not require the preprinting of the punched cards with column identifying marks and provides adequate resolution for counting the columns of a punched card as it is read. However, it has the disadvantage of being easily scratched or otherwise defaced or broken that may contribute to false signal. Furthermore, the sensing photoelectric cells lose their sensitivity with age and can fail completely in use, providing no reading or wrong readings. Furthermore, alignment of the glass wheel is critical. Still other timing disks operate on the same principle but are constructed of opaque material having slots therein for the transmission of light. The same disadvantages are applicable to this system with the exception of malfunction by scratches, or defacement.

Accordingly, it is a primary object of the present invention to provide an apparatus and a circuit for generating counting pulses for a card reader that is both reliable, accurate, and relatively inexpensive.

It is another object of the present invention to provide an apparatus for generating timing pulses having high-resolution capability for accurate measurement or counting.

It is a further object of the present invention to provide an apparatus for generating high-resolution timing pulses for a card reader that avoids the above problems.

It is still a further object of the present invention for generating high-resolution timing pulses from a sensor whose output accuracy is independent of the speed of the toothed wheel.

These and other objects of the present invention, together with various features thereof, will become apparent from the following detailed specification when read with the accompanying drawings.

SUMMARY OF THE INVENTION

The foregoing objects of the invention are attained by a system comprising generally and in combination at least two magnetoresistor sensors mounted on a permanent bar magnet assembly, electrically coupled to at least two amplifiers, two pulse generators and a pulse adder to produce in combination with the rotation of a toothed wheel at least four pulses per tooth.

Each magnetoresistor sensor will generate an electric signal having one complete sinusoidally varying cycle per tooth. By displacing the two magnetoresistor sensors by a distance equal to half a tooth length, two sinusoidally varying electric outputs are obtained which are 90 electrical degrees out of phase. The output from each sensor is amplified and electric pulses are generated at the zero crossings of the sinusoidal waves. The electric pulse outputs are then added to form a pulse train for use as counting or timing signals. High resolution is obtained because four times the number of pulses are generated as there are teeth on the wheel.

BRIEF DESCRIPTION OF THE DRAWINGS

Other objects and advantages of the invention will become obvious from a consideration of the following description of the claims taken together with the accompanying drawings wherein:

FIGS. 4A and 4B are equivalent electrical diagrams of the magnetoresistive sensing elements useful in explaining the invention;

FIGS 5A and 5B are plots of sinusoidal curves generated by magnetoresistive sensing elements of the invention;

FIG. 6 are timing pulses generated at various stages by the invention;

FIG. 7 is a truth table for a logic subcircuit of the invention, useful in explaining the invention.

DETAILED DESCRIPTION OF THE INVENTION

Figure 1:
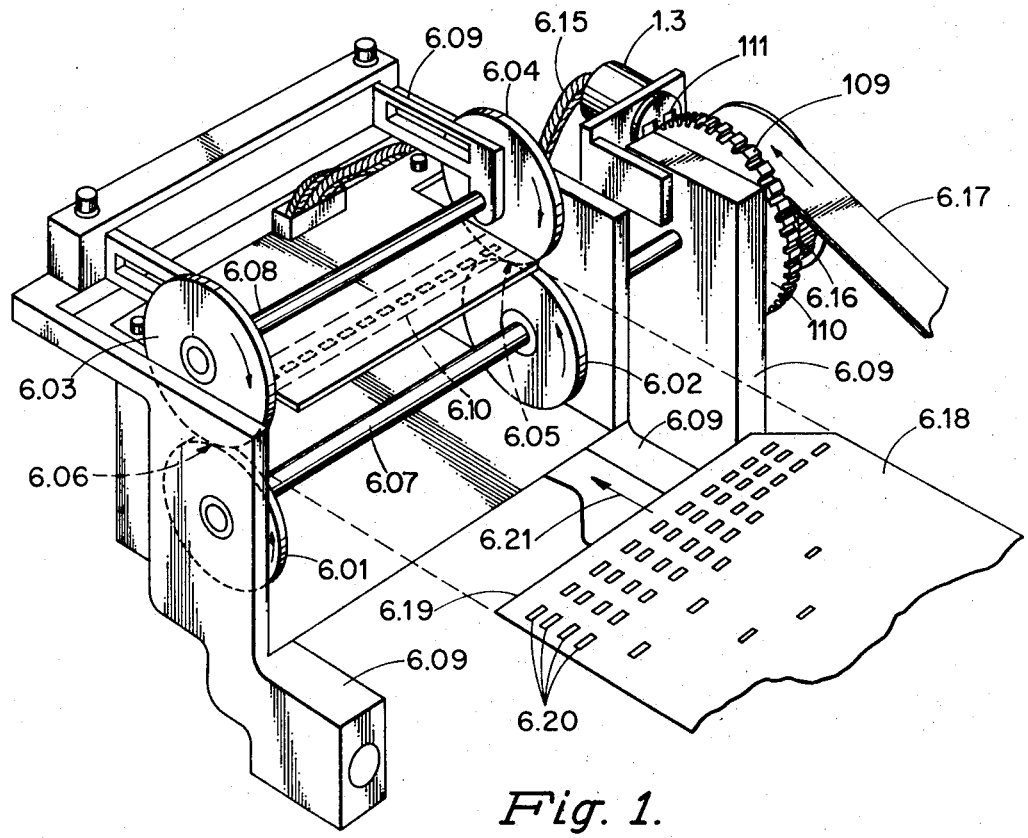
FIG. 1 is a pictorial view of the card read-feed mechanism in relation to the magnetic clock generator.

FIG. 1 shows a pictorial view of the read-feed mechanism of the card reader in relation to magnetoresistor assembly and toothed wheel or gear. Capstan rolls 6.01 and 6.02 are rigidly connected to a shaft 6.07, said assembly consisting of capstan rolls and shaft being rotatably mounted on frame 6.09. Similarly, capstan follower rolls 6.03 and 6.04 are rigidly mounted on a shaft 6.08, said assembly being rotatably spring mounted on frame 6.09 and having capstan rolls 6.03 and 6.04 respectively disposed in frictional circumferential rolling contact with capstan rolls 6.01 and 6.02 respectively. Toothed wheel, or gear 110 having a multiplicity of teeth 109 about its periphery is also rigidly mounted on shaft 6.07 for synchronous rotation therewith. Rotary power is applied to the assembly consisting of capstans 6.01 and 6.02, shaft 6.07 and gear 110, via a belt and pulley arrangement 6.17, 6.16 which rotates capstan rolls 6.01 and 6.02 in a counter clockwise direction as shown in FIG. 1. Capstan rolls 6.03 and 6.04 respectively making frictional contact with capstan rolls 6.01 and 6.02 respectively at point 6.06 and 6.05 are consequently rotated in a clockwise direction as shown by the arrows on FIG. 1. Punched card 6.18 is urged by a pusher mechanism (not shown) in the direction of the arrow 6.21 into frictional engagement with capstan rolls 6.01, 6.02, 6.03, and 6.04. As the leading edge 6.19 of punch card 6.18 contacts the capstan rolls' pinch points 6.06 and 6.05 it is firmly gripped frictionally and transported still in the direction of the arrow 6.21 past the reading station 6.10. As the coded columns 6.20 of punch card 6.18 travel past the read-station 6.10 under the urging and guidance of the capstan rolls the synchronous rotation of the gear teeth 109 past the face of the magnetoresistor sensor 111 of magnetoresistor assembly 1.3 which is disposed in spatial alignment with gear teeth 109, generates clocking pulses (to be later described in detail) synchronously with said columns 6.20 for counting and identifying each of said column 6.20 for synchronously counting and/or transmitting the information read at read-station 6.10 to other parts of the computer system. The magnetoresistor assembly 1.3 comprising the magnetoresistor sensor 111 and associated magnets and circuitry shown in later figures is electrically coupled via coupling wires 6.15 to the read-station 6.10 for counting and transmitting synchronizing signals.

Figure 1A:
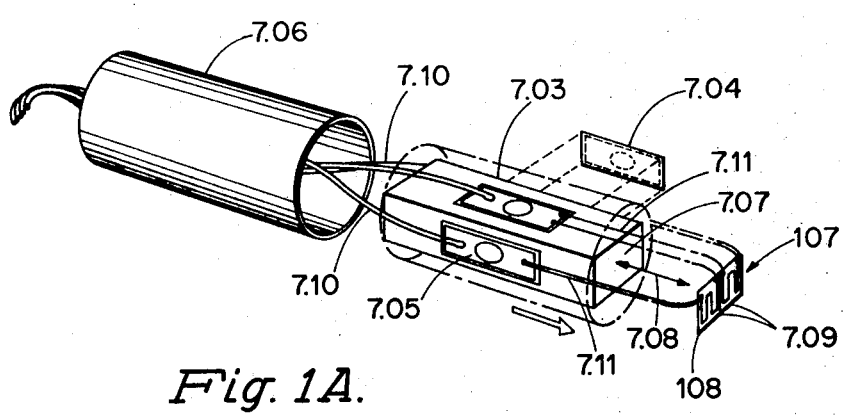
FIG. 1A is an exploded pictorial view of the essential elements of a magnetoresistor assembly.

In FIG. 1A, magnetoresistor sensing elements 107 and 108 to be herein referred to as Hall electrodes which may be of any semiconductor material, such as silicon, germanium, indium antimonide, indium arsenide, and gallium arsenide, generally having high-electron hole mobility, or even of that class of material known as semimetals, are shaped and electrically connected to each other in one plane and having specified dimensions within that plane between electrical connection as later described in more detail are disposed in insulated spatial face-to-face alignment with one face 7.07 of a bar magnet 7.03 such that the plane 7.07 of magnetoresistor Hall electrodes 107 and 108 are substantially perpendicular to the magnetic flux represented by arrow 7.08. Electrical connections from Hall electrodes 107 and 108 to outside circuitry is effected by means of electrical connecting means 7.05, 7.10, and 7.11. A housing 7.06 provides a nonmagnetic shield and packaging means for the assembly. The space between bar magnet 7.03 and inside wall of housing 7.06 may be filled by a material such as epoxy, not shown.

Figure 2:
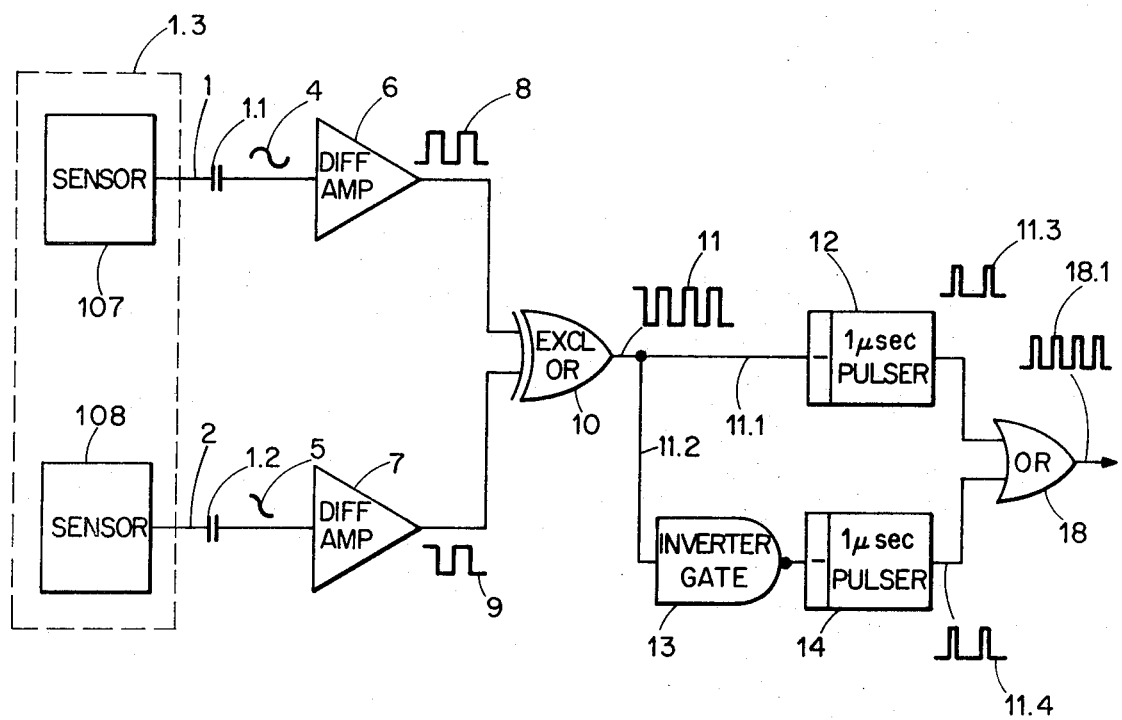
FIG. 2 is a block diagram of the electrical circuit utilized in the invention.

In FIG. 2, magnetoresistor assembly 1.3 described generally in FIG. 1A is comprised of sensing elements or Hall Electrodes 107 and 108 to be later more fully described. Each sensing element 107 and 108 has its output fed to coupling capacitors 1.1 and 1.2 respectively to eliminate any unwanted low signal frequency noise which is generally due to run-out effect (by run-out is meant the variation in distance between the toothed wheel 110 and the magnetoresistor sensor 1.3 in FIG. 1, as the toothed wheel rotates past the sensing device). The rotation of the toothed wheel past the magnetoresistor sensing elements or Hall electrodes 107 and 108 generates sinusoidally varying electric signals to be later described in greater detail. The sinusoidal varying electric signals 4 and 5 are essentially the same as the signals from the sensing elements 107 and 108, with the noise signal essentially filtered out. The output of capacitors 1.1 and 1.2 is coupled to the input of differential amplifiers 6 and 7 respectively. These differential amplifiers may be any of the variety of commercially available devices such as an A710 differential Comparator type commercially obtainable from Fairchild Semiconductor Corp. The outputs of the differential amplifiers 6 and 7 are coupled to an exclusive OR-circuit 10. Again the exclusive OR-circuit is commercially obtainable from any number of sources such as Texas Instrument Semiconductor Corp. who manufacture the SN7486 exclusive OR-circuit utilized in this embodiment. The output from exclusive OR-circuit 10 branches into two circuits 11.1 and 11.2. The branch 11.2 is coupled to an inverter gate 13 of a type designated SN7404 obtainable commercially from Texas Instrument Semiconductor Corp. The output from inverter gate 13 is coupled into the input of 1 microsecond negative pulser 14. The branch 11.1 output of the exclusive OR-circuit 10 is coupled into the input of 1 microsecond negative edge pulser 12 (a more detailed description of pulsers 12 and 14 is later given in connection with FIG. 2A). The outputs from negative edge pulsers 12 and 14 are coupled with the input of OR-circuit 18.

The sinusoidally varying electric signals 4 and 5 from capacitors 1.1. and 1.2 previously described are fed into the differential amplifiers 6 and 7 which convert the signals to square wave signals 8 and 9. The symmetrical square waves signals 8 and 9 are 90° out of phase with each other as are the sine waves 4 and 5. The two symmetrical square waves 8 and 9 are then fed into an exclusive OR-circuit 10 which essentially adds square wave signals 8 and 9 together and provides an output square wave 11 from the exclusive OR-circuit which is twice the frequency of either square wave 8 or 9. The square wave 11 is fed in parallel to a 1 microsecond pulse generator 12 and also to an inverter gate 13 and then to a microsecond pulse generator 14. Pulse generator 12 provides a 1 microsecond pulse at its output by utilizing the trailing edge of square wave 11 and pulse generator 14 provides a 1 microsecond pulse at its output by utilizing the leading edge of square wave 11 through the use of the inverter 13. Pulse outputs 11.3 and 11.4 are combined and added in OR-circuit 18 which outputs a pulse train 18.1 which has a frequency four times the frequency of either of the sinusoidal signals 4 and 5. (A more detailed description of the generation of the pulses at the various stages are given in connection with later discussion of the remaining FIGURES).

Figure 2A:
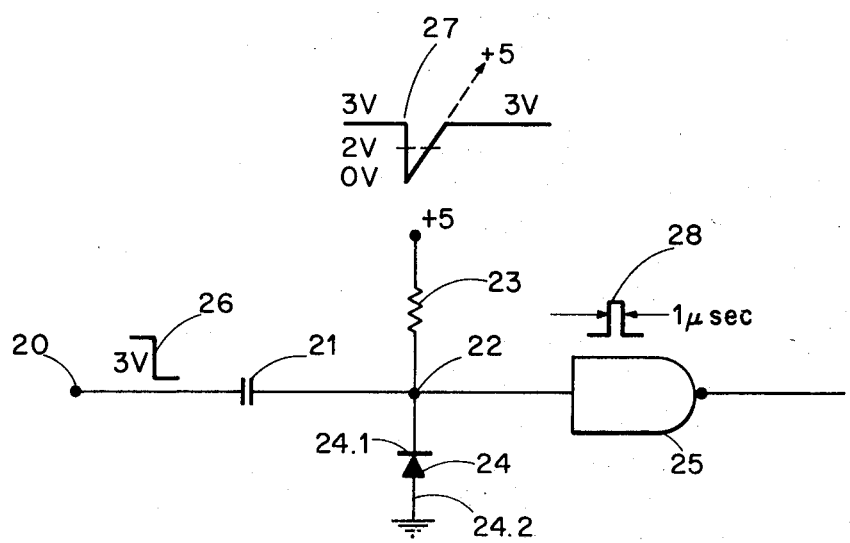
FIG. 2A is a schematic electrical diagram of a subcircuit utilized in the invention.

In FIG. 2A a more complete schematic diagram of pulse generators 12 and 14 is shown. A capacitor 21 has one of its plates connected to the input 20 and the other plate connected to the junction 22; junction 22 is connected to one end of a resistor 23, while the other end of resistor 23 is connected to a +5 voltage source. Junction 22 is further directly connected to the cathode 24.1 of a zener diode 24, whereas the plate of zener diode 24 is connected to ground. Again junction 22 is further directly connected to the input or an inverting gate 25.

The purpose of this circuit is to provide a 1 microsecond pulse on a negative edge input 26 of a square wave pulse so for a square wave input at terminal 20 the output will be a 1 microsecond pulse 28; hence for every negative edge at the input of the capacitor 21 a 1 microsecond pulse results at the output of inverting gate 25. This result is substantially accomplished as follows: junction 22 is normally clamped at a 3 volt level by zener diode 24 which acts as a clamping diode; as long as junction 22 remains at a level greater than 2 volts the inverting gate 25 will remain in its low state or 0 volts. However, when junction 22 drops below the 2 volt level inverting gate 25 will switch to its high level. Consequently when a negative going signal is applied at terminal 20, this negative going edge is differentiated by capacitor 21 and the negative edge is seen at point 22. Therefore junction 22 at the negative edge 27 on FIG. 2A will pulse from its normal 3 volt level in a negative direction by the same amount that terminal 20 went negative. Since terminal 20 drops 3 volts, the junction at 22 will go from its normal 3 volt level to a 0 volt level. In this excursion from 3 volts to 0 volts junction 22 passes through the 2 volt threshold level and switches inverting gate 25 from its low state to its high state. The waveform 27 at junction 22 which has dropped from 3 volts to 0 volts will start to rise to the 5 volt level through resistor 23 and hence will also start charging capacitor 21 toward the 5 volt level. During this charge time when junction 22 passes through its 2 volt level toward the 3 volt, again the inverter gate 25 is switched back to its low state. Therefore, inverter gate 25 which normally has a low output and went to a high level during the transition of waveform 20, stayed at a high level until junction 22 recharged back again to its 2 volt trip point, and switched inverting gate 25 to its low level again. Consequently, the width of pulse 28 is determined by the charging rate of capacitor 21 through resistor 23, or its RC time constant.

Figure 3A:
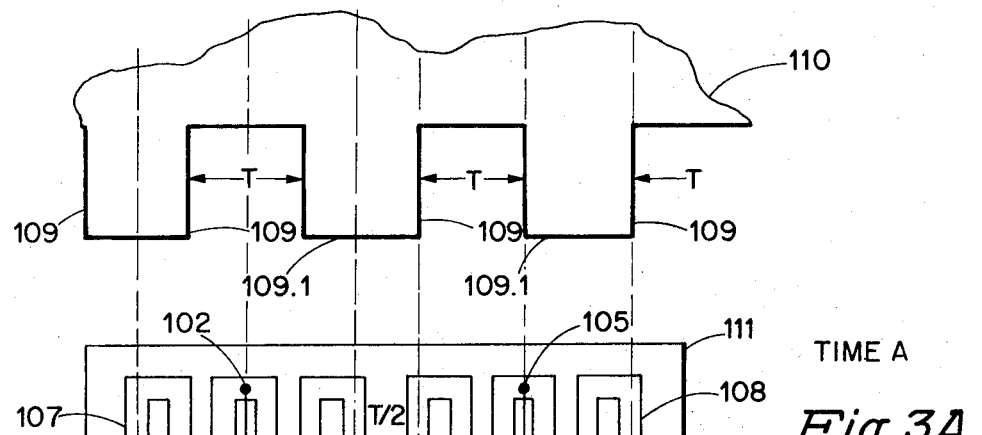
FIGS. 3A, 3B and 3C show relative positions of teeth and magnetoresistive sensing elements of the invention at different times.

FIGS. 3A, B, C FIGS. 4A, B FIGS. 5A and B are utilized together to explain how the two sinusoidally varying signals 4 and 5 of FIG. 2 which are 90° out of phase with each other are generated. In FIG. 3A, a magnetoresistor sensor 1.3 is shown electrically coupled at terminals 103 and 104 to 2 Hall electrodes which have a variable resistance in accordance to flux variation perpendicular to them. Magnetoresistor sensor 1.3 is comprised of two separate magnetoresistor elements or Hall electrodes 107 and 108 of any magnetoresistive material such as germanium or indium antimonide, each magnetoresistive element 107 and 108 having the shape of a square-shouldered meander line, although any other suitable shape may be utilized. A toothed wheel 110 having teeth 109 of length T equal to the length T of the recess of the toothed wheel 110. Under normal operating conditions the face 109.1 of the geared teeth 109 would be in a position such that it is parallel to the face of plane 1.3. However, to avoid confusion during explanation, the gear 110 has been shown rotated 90° into the plane of face 1.3.

Figure 3B:
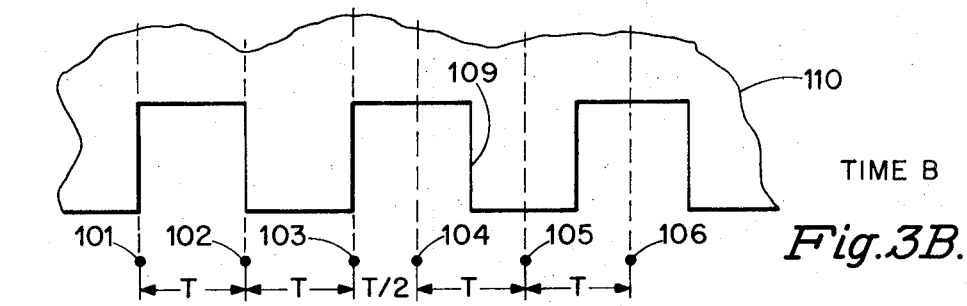
Figure 3C:
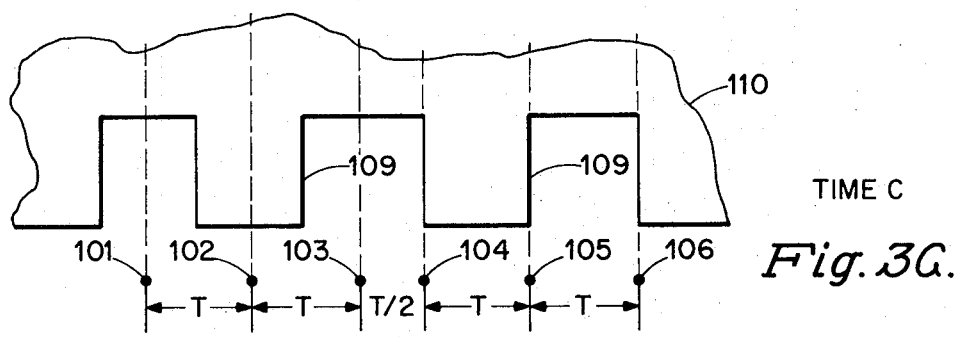

It will be understood, therefore, that as gear 110 rotates the face 109.1 of teeth 109 will be substantially parallel to the plane of magnetoresistors 107 and 108 and the magnetic flux lines of magnet 7.03 of FIG. 1A will be perpendicular to the plane of face 1.3. The dimensions of the meander line of resistive elements 107 and 108 relative to the geared teeth are crucial, and so is the spacing between the Hall electrode meander line elements 107 and 108. Hence, the horizontal distance of one Hall electrode such as 107 from terminal 101 to terminal 103 is equal to twice the dimension 2T of one tooth length T, or equal to the dimension of one tooth plus one recess between teeth. Terminal 102 of Hall electrode 107 is the horizontal midpoint between terminals 101 and 103. This relationship also holds true for the Hall electrode 108 with respect to its terminals 104, 105, and 106. The horizontal distance between the last terminal 103 of Hall electrode 107 and the first terminal 104 of Hall electrode 108 is equal to one half the length T/2, of a wheel tooth. On FIG. 3A, it will be observed that the first leg of Hall electrode 107 is electrically connected to the first leg of Hall electrode 108 at terminals 101 and 104 respectively; also the last leg of Hall electrode 107 and the last leg of Hall electrode 108 are electrically connected at terminals 103 and 106 and are also connected to ground. The midterminals 102 and 105 respectively of Hall electrodes 107 and 108 respectively are connected to the input plate of capacitors 1.1 and 1.2 respectively whereas the output plate of capacitors 1.1 and 1.2 respectively are connected to differential amplifiers 6 and 7 of FIG. 2 respectively. FIG. 3B shows the gear 110 relative to terminals 101, 102, 103, 104, 105, and 106 of FIG. 3A at a time B when the teeth 109 have moved a half a tooth length T/2 to the left relative to the aforementioned terminals; and FIG. 3C shows the gear 110 relative to the aforementioned terminals at a time C when the teeth 109 have moved a full tooth length T relative to the terminals hereinbefore mentioned, at time A.

FIG. 4A is an equivalent circuit of magnetoresistive element 107 and shows the equivalent resistor 107.1 being connected through a +5 volt level to terminal 101 on one end and also connected to ground and to terminal 103 at its other end, whereas its midpoint is connected to terminal 102. Similarly, FIG. 4B shows the equivalent resistor 108.1 of magnetoresistive element or Hall electrode 108 being connected to a +5 volt source and to terminal 104 at one end and to terminal 106 and ground at the other end whereas its midpoint is connected to terminal 105. The numbered terminals of FIGS. 4A and 4B are the same as the numbered terminals of FIGS. 3A, 3B, and 3C. In actual practice, the magnetoresistor sensor 1.3 is mounted on the face of one end of a permanent bar magnet (previously shown and described FIG. 1A) substantially perpendicular to the lines of flux.

FIGS. 5A and 5B show the time intervals A, B, and C as the abscissa, and the output voltage signal from sensors 107 and 108 as the ordinate.

FIG. 3A at time A shows the same amount of metal exposed between terminals 101 and 102 as between terminals 102 and 103; it also shows that between terminals 104 and 105 of resistive element 108 there is present a substantial airgap whereas between terminals 105 and 106 there is present a substantial amount of metal; hence, there is a difference of metal exposed between terminals 104 and 105 then between terminals 105 and 106. Since a magnetoresistor has the characteristic that its resistance varies in proportion to the flux perpendicular to it and since more flux will be concentrated at sections where there are more metal, it can be seen that the flux between terminals 101 and 102 and terminals 102 and 103 of resistive element 107 will be equal, consequently the resistance between terminals 101 and 102 will be equal to the resistance between terminals 102 and 103 and a null point results at output 102 of sensor element 107. On the other hand, the amount of flux between terminals 105 and 106 of sensor or Hall electrode 108 is greater than the amount of flux between the terminals 104 and 105 consequently, the resistance between terminals 105 and 106 will be greater than the resistance between terminals 104 and 105 and a voltage signal results at the output terminal 105 of sensor or Hall electrode 108; also because this latter condition represents the maximum amount of flux between terminals 105 and 106 relative to terminals 104 and 105 the voltage signal at time A at the output 105 of sensor 108 will be a maximum. These conditions are plotted on FIGS. 5A and 5B for time interval A.

In FIG. 3B which represents time interval B, wherein the gear 110 has moved a distance equal to a half tooth length T/2 toward the left, the amount of metal exposed on the horizontal distance between terminals 101 and 102 is at a minimum whereas the amount of metal exposed between terminals 102 and 103 is at a maximum. Similarly the amount of metal exposed between terminals 104 and 105 and also between terminals 105 and 106 are equal; hence, under these conditions the voltage at output terminals of 102 of sensor 107 is at a maximum whereas the voltage signal at output terminal 105 of sensor 108 is at a minimum.

FIG. 3C represents a time interval C wherein the gear 110 has moved an additional half gear tooth length from time interval B. It is seen that with these sets of conditions the amount of metal exposed between terminals 101 and 102 and 102 and 103 of sensor 107 is once again equal and the amount of metal exposed between terminals 104 and 105 and terminals 105 and 106 of sensor 108 is unequal but is in inverse relationship from time A. Consequently, there will once again be a minimum output for a sensor 107 at time C and a maximum output for sensor 108 but in the opposite direction. As the gear progresses across the face of the sensing elements 107 and 108, sinusoidally varying voltage signals are generated which are 90° out of phase with each other. It will be observed here that irrespective of the speed of the gear 110 the crossover points of the sinusoidally varying signals will always occur at the same point because this relationship is positioned dependent relative to the terminals and gear teeth. Furthermore, the nearness of the sensing element to the gear teeth has no effect on the crossover points of the sinusoidal curves. Hence, slight variations in the eccentricity of the toothed wheel 110 as it rotates past the magnetoresistive elements of 111 will not vary the crossover points. As a result of the phenomenon it is at this crossover point where we wish to generate our fine square wave clocking pulses.

In FIG. 6, the horizontal distance has been divided into equal time intervals of one quarter of the wavelength of the sinusoidal output curve from either sensor 107 or 108 of FIGS. 4A and 4B. The vertical line has been divided into several positions corresponding to the output of the correspondingly marked elements of FIG. 2. Referring therefore to FIG. 6 and to FIG. 2, a sinusoidally varying signal (F1, F4) and (F2, F5) is generated as previously described and appears at points 1, 2, 4, and 5 of FIG. 2. Square wave F8 is generated at the crossover points of F (1, 4) and F9 is generated at the crossover points of sinusoidally varying curve F (2, 5). Since the sinusoidally varying curves are 90° out of phase, the square wave curves F8, F9 which appear on FIG. 2 as 8 and 9 will also be 90° out of phase. The square wave curves F8 and F9 are essentially added in the exclusive OR-circuit 10 of FIG. 2, and appear as a single output square wave curve F11 at the output of the OR-circuit 10. In FIG. 7, we have the truth table of the exclusive OR-circuit 10 of FIG. 2, and it is seen that when the inputs 8 and 9 to exclusive OR-circuit 10 are alike the output of exclusive OR-circuit 10 will be low. If on the other hand, the inputs at 8 and 9 to exclusive OR-circuit 10 of FIG. 2 are unlike the outputs of exclusive OR-circuit 10 will be high. Referring again to FIG. 6 and to square wave curves F8, F9 and F11, it will be observed that at time interval 1, the amplitudes of square wave curves F8 and F9 are unlike, and according to exclusive OR-truth table, the resulting square wave curve F11 will be high. At time interval 2, it will be observed that the amplitudes of F8 and F9 are alike, hence, F11 will be low. This process can be traced throughout the various time intervals to obtain a square wave curve F11. Square wave curve F13 is similar to square wave curve F11 except that it has been inverted by inverter gate 13 of FIG. 2 and consequently has an amplitude opposite to square wave F11. As was hereinbefore described, the negative edge of F11 was utilized to develop a microsecond pulse F12 and negative edge of F13 which as can be seen, corresponds to the positive edge of F11 was utilized to form a microsecond pulse F14 by microsecond pulse generators 12 and 14 of FIG. 2. Finally, microsecond pulses F12 and F14 were essentially added by OR-circuit 18 of FIG. 2 to produce the pulse trains F18 which as can be seen has four times the frequency of the original sinusoidally varying signals generated by the magnetoresistor and toothed wheel.

It becomes quite evident now that since we have 4 pulses per tooth, a fine vernier scale has been produced for each tooth. Consequently, if a gear, for example, has 220 teeth for every revolution, 880 pulses per revolution are produced. This is a much finer scale for indicating the position of the gear tooth wheel in its path. Hence, any pertinent wheel originally fixed relative to the gear can similarly utilize the finer vernier measurement generated by the afore-described method and apparatus.

It can also be seen that more than two sensing elements or Hall electrodes can be combined utilizing the principles disclosed herein, to produce an even finer vernier scale for each tooth.

It will be apparent from the foregoing disclosure of the invention that numerous modifications, changes and equivalents will now occur to those skilled in the art, all of which fall within the true spirit and scope contemplated by the invention.

What is claimed is:
1. A high-resolution magnetic clock generator comprising
   A. a frame;
   B. a toothed wheel having a plurality of teeth about its periphery said toothed wheel rotatably mounted on said frame;
   C. a plurality of sensing means responsive to said teeth for generating at least two sinusoidally varying electric signals, said sensing means being disposed in spaced relationship with the teeth of said toothed wheel and being located along the periphery of said toothed wheel, said sensing means also being displaced relative to each other along the periphery of said toothed wheel by a distance of multiples of half the distance between adjacent teeth;
   D. translating means coupled to said sensing means for converting said sinusoidally varying electric signals into a train of electric pulse signals;
   E. and output means coupled to said translating means for abstracting said train of electric pulse signals from said translating means.
2. A high-resolution magnetic clock generator as recited in claim 1 wherein said toothed wheel is composed of a material having low permeability and said teeth are substantially equidimentioned and equidistant from each other.
3. A high-resolution magnetic clock generator as recited in claim 2 wherein said low-permeability material is selected from the group consisting of soft iron, nickel and cobalt.
4. A high-resolution magnetic clock generator as recited in Claim 1 wherein said sinusoidally varying electric signals are 90° out of phase with each other.
5. A high-resolution magnetic clock generator as recited in claim 1 wherein said sinusoidally varying electric signals are an odd multiple of a quarter of a wavelength out of phase with each other.
6. A high-resolution magnetic clock generator as recited in claim 1 wherein said sensing means comprises a magnetoresistor.
7. A high-resolution magnetic clock generator as recited in claim 6 wherein said magnetoresistor comprises a bar magnet and at least two Hall electrodes electrically coupled to each other and disposed substantially in one plane, said plane disposed in spatial relationship with one pole of said magnet substantially perpendicular to the magnetic flux of said pole.
8. An apparatus as recited in claim 7 including coupling means at both ends and at the midpoint of each of said Hall electrodes for introducing or removing electric signals, said coupling means from the midpoint of each of said Hall electrodes to the coupling means at either end of each of said Hall electrodes being separated by a distance equal to one toothed length of said toothed wheel.
9. A high-resolution magnetic clock generator as recited in claim 8 wherein said Hall electrodes are longitudinally separated one from the other by distance equal to one-half of tooth length of said toothed wheel.
10. A high-resolution magnetic clock generator as recited in claim 7 wherein the Hall electrodes are comprised of semiconductor material.
11. A high-resolution magnetic clock generator as recited in claim 10 wherein the semiconductor material is selected from the group consisting of germanium, silicon, indium antimonide, indium arsenide, and gallium arsenide.
12. A high-resolution magnetic clock generator as recited in claim 1 wherein said translating means comprises an electrical network electrically coupled to said sensing means.
13. A high-resolution magnetic clock generator as recited in claim 12 wherein said electrical network comprises a plurality of differential amplifier means coupled to said sensing means for converting said sinusoidally varying electric signals to square wave electric signals, a plurality of electric pulse generator means coupled to said amplifier means for generating electric pulse signals from said square wave electric signals, and summing means coupled to said pulse generator means for summing said electric pulse signals.
14. A high-resolution magnetic clock generator as recited in claim 13 wherein a coupling capacitor is electrically connected between said sensing means and said amplifier means for electrically coupling said sensing means to said electrical network and for eliminating low frequency noise.
15. A high-resolution magnetic clock generator as recited in claim 13 including inverting gate means coupled to said differential amplifier means and to one of said pulse generator means for inverting said square wave to one of said pulse generator means.
16. In combination with an apparatus for synchronously transferring information from a punched card reader to a data processor, said information being stored in said punched cards in uniformly spaced columns, and comprising a read station responsive to said stored information on said punched cards, rotatable punched-card feed capstan rolls for transporting successive punched cards past said read station, and means for rotating said capstan rolls, the improvement which comprises:
   A. a toothed wheel having a multiplicity of teeth about its circumference, said toothed wheel rotatably mounted on said apparatus for synchronous rotation with said capstan rolls;
   B. sensing means responsive to said teeth for generating at least two sinusoidally varying electric signals;
   C. and translating means coupled to said sensing means for converting said sinusoidally varying electric signals into a train of electric pulse signals.
17. The combination as recited in claim 16 wherein said sensing means comprise a magnetoresistor.
18. The combination as recited in claim 17 wherein said magnetoresistor comprises a bar magnet at least two Hall electrodes electrically coupled to each other and disposed substantially in one plane, said plane disposed in spatial relationship with one pole of said magnet substantially perpendicular to the magnetic flux of said pole, and including coupling means at both ends and at the midpoint of each of said Hall electrodes for introducing or removing electric signals, said coupling means from the midpoint of each of said Hall electrodes to the coupling means at either end of each of said Hall electrodes being separated by a distance equal to one tooth length of said toothed wheel.

19. The combination as recited in claim 18 wherein said Hall electrodes are longitudinally separated one from the other by a distance equal to one-half a tooth length of said toothed wheel.

20. The combination as recited in claim 16 wherein said translating means comprises an electrical network electrically coupled to said sensing means.

21. The combination as recited in claim 20 wherein said electrical network comprises a plurality of differential amplifier means coupled to said sensing means for converting said sinusoidally varying electric signals to square wave electric signals, a plurality of electric pulse generator means coupled to said amplifier means for generating electric pulse signals from said square wave electric signals, and summing means coupled to said pulse generator means for summing said electric pulse signals.

* * * * *